105. RAIL

DRAFTSMAN

C. A. LINDSTRÖM.

CAR DOOR OPERATING MECHANISM.

APPLICATION FILED FEB. 7, 1911.

Reissued May 12, 1914.

13,725.

3 SHEETS—SHEET 1.

Witnesses

Frank C. Miller

Lela M. Grinder

Inventor

Charles A. Lindström

C. A. LINDSTRÖM.

CAR DOOR OPERATING MECHANISM.

APPLICATION FILED FEB. 7, 1911.

Reissued May 12, 1914.

13,725.

3 SHEETS—SHEET 2.

Witnesses
Frank E. Miller.
Lela M. Grunder.

Inventor
Charles A. Lindström.

COLUMBIA PLANOGRAPH CO., WASHINGTON, D. C.

C. A. LINDSTRÖM.
CAR DOOR OPERATING MECHANISM.
APPLICATION FILED FEB. 7, 1911.
Reissued May 12, 1914.
13,725.
3 SHEETS—SHEET 3.
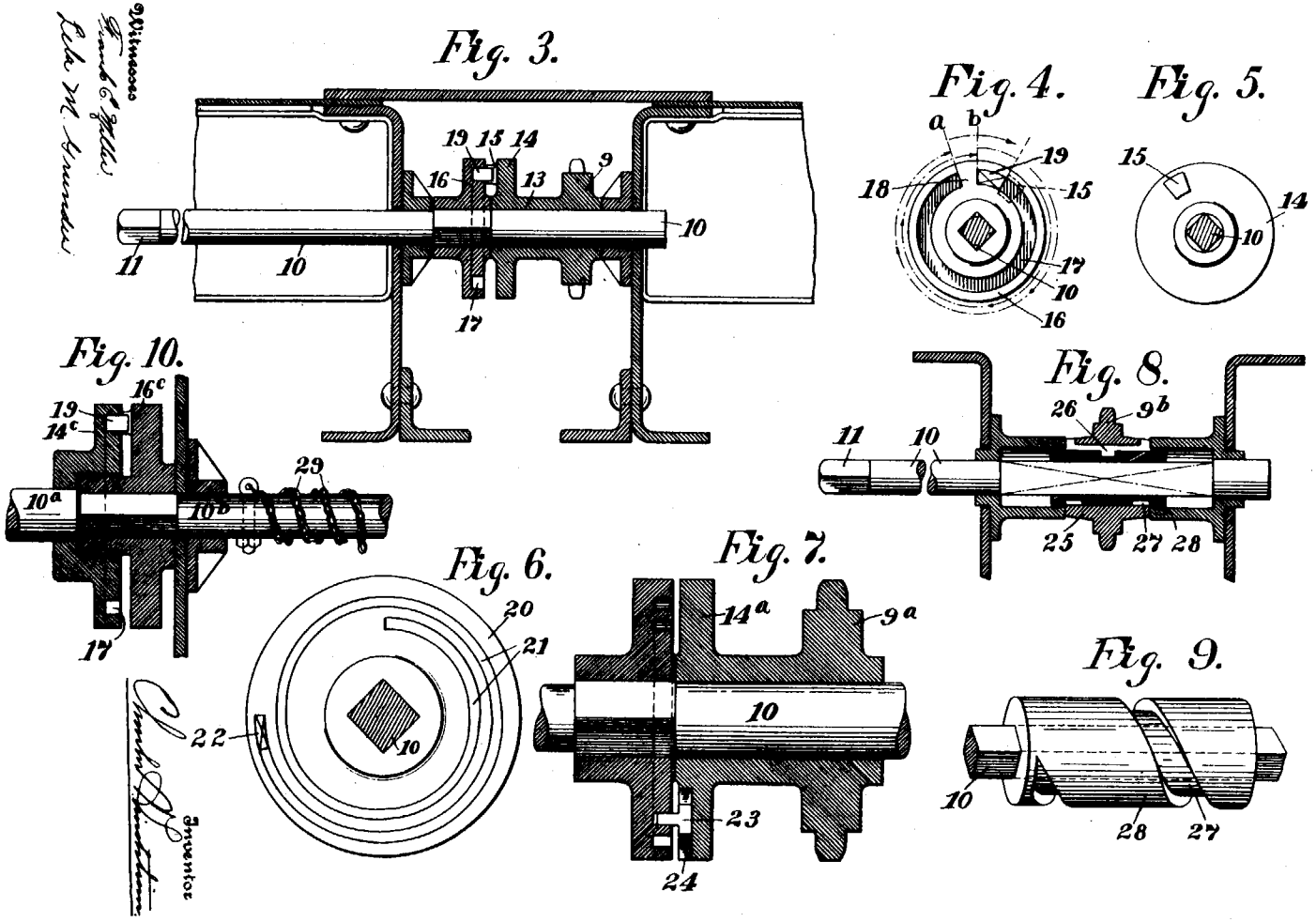
COLUMBIA PLANOGRAPH CO., WASHINGTON, D. C.

290

UNITED STATES PATENT OFFICE.

CHARLES A. LINDSTRÖM, OF PITTSBURGH, PENNSYLVANIA.

CAR-DOOR-OPERATING MECHANISM.

13,725. Specification of Reissued Letters Patent. Reissued May 12, 1914.

Original No. 886,380, dated May 5, 1908, Serial No. 378,795. Application for reissue filed February 7, 1911. Serial No. 607,207.

*To all whom it may concern:*

Be it known that I, CHARLES A. LINDSTRÖM, of Pittsburgh, East End, Allegheny county, Pennsylvania, have invented a new and useful Improvement in Car-Door-Operating Mechanisms, of which the following is a full, clear, and exact description, reference being had to the accompanying drawings, forming part of this specification, in which—

Figure 1:
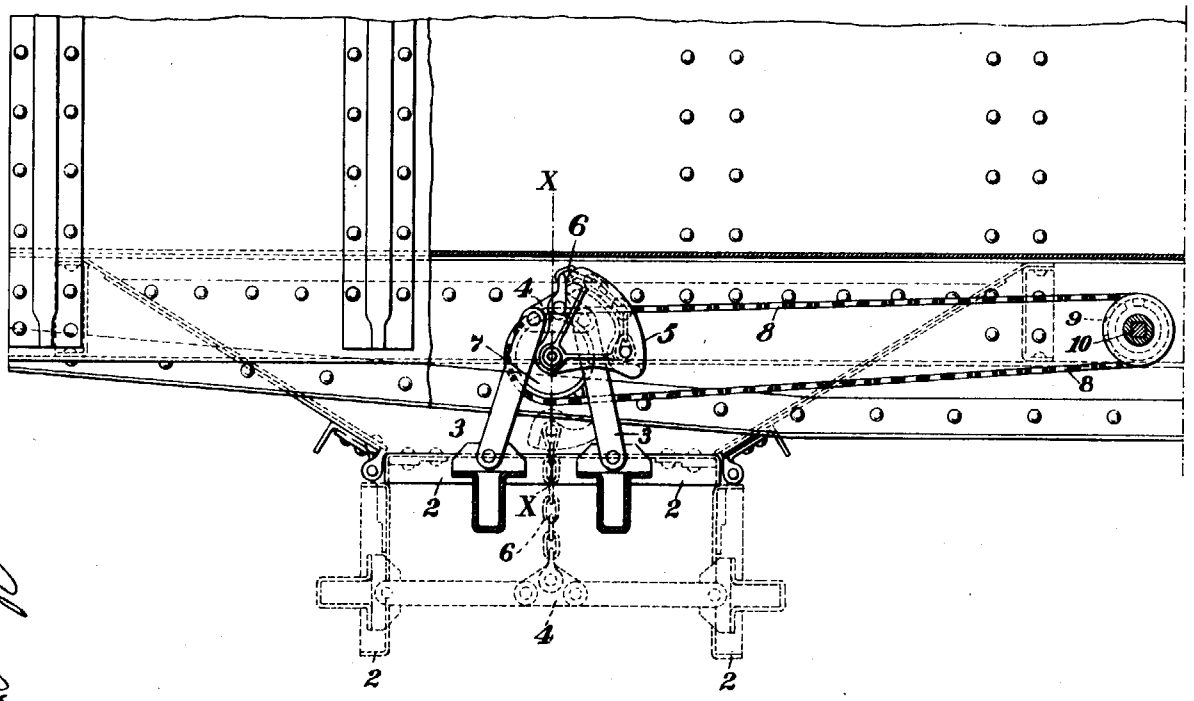
Figure 2:
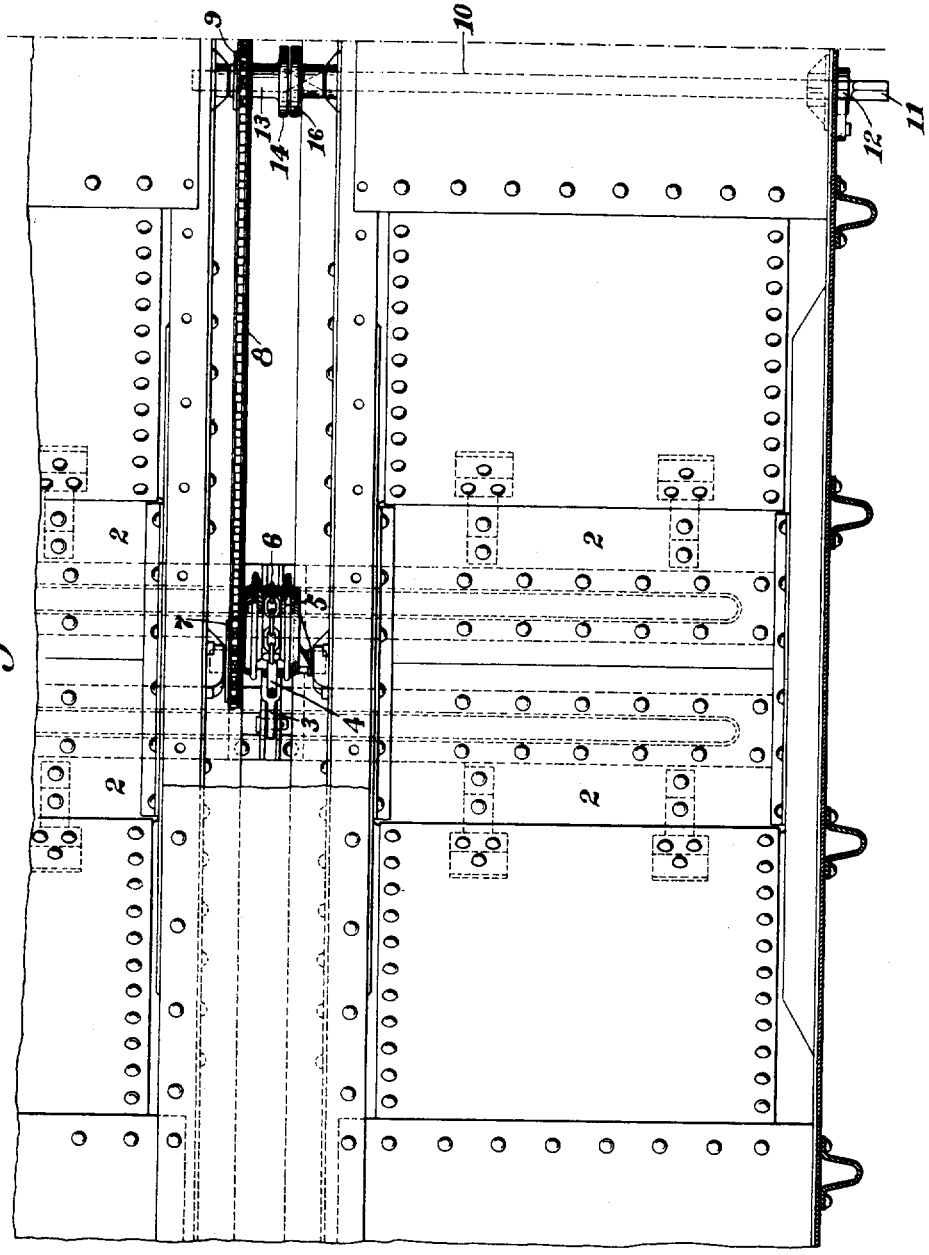

Figure 1 is a side view showing part of a car partly broken away to illustrate the operating mechanism; Fig. 2 is a plan view of a portion of the car; Fig. 3 is a detail sectional view showing one form of the clutch for operating the doors; Figs. 4 and 5 are detail views of the clutch members shown in Fig. 3; Fig. 4 also illustrating diagrammatically the movements which take place between the clutch members; Fig. 6 is an end view showing a modified form of clutch member; Fig. 7 is a sectional view showing the clutch embodying the member of Fig. 6; Fig. 8 is a sectional view showing another form of the clutch; Fig. 9 is a detail perspective view of one of the clutch members of Fig. 8; and Fig. 10 is a sectional view of another form of clutch.

My invention has relation to car door operating mechanism, and more particularly to a safety device for use in connection therewith, the object of my invention being to provide means whereby the sudden opening of the doors, when released, will not cause injury to the operator.

In that class of car door operating mechanism wherein a wrench or other hand tool is applied to an operating shaft for the purpose of releasing the doors from their closed position, it frequently happens that the load acting upon the doors as soon as they are released suddenly thrusts them open, thereby moving the actuating mechanism very quickly, together with the wrench which is still in the hands of the operator. This sudden movement may result in injury to the operator, who may be struck by the rapidly moving tool or may be thrown thereby.

My invention provides a lost-motion device or clutch which is interposed between that part of the operating mechanism to which the wrench or other tool is applied and that part which is connected to the doors, and which is so constructed and arranged as to permit a considerable movement of the latter, when the doors are released, without moving the part to which the wrench of the tool is applied, as will be hereinafter more fully described.

I have shown my invention as applied to car door operating mechanism of the character described and claimed in my Patent No. 805,920, of November 28th, 1905, but it will be readily understood that it may be applied to various other forms of operating mechanisms.

Referring to the accompanying drawing, the numeral 2 designates the hinged downwardly opening doors, 3 the arms or links which connect the same to an equalizing member 4 connected to a segment 5 by a chain 6. The segment 5 is integral with or attached to a sprocket wheel 7, which is driven by a chain 8 from a wheel 9 on an operating shaft 10. These parts are all substantially as in my former patent, to which reference may be had for the details of construction and arrangement. This mechanism, as described in said patent, provides means whereby the doors are normally held in closed position owing to the fact that the point of bearing of the chain 6 is past the central vertical line X—X of Fig. 1 when the doors are in closed position. The actuating shaft 10 is journaled transversely of the car in suitable bearings, and is provided at one or both ends with a squared portion 11 which forms a seat for a wrench or other hand operated tool. 12 is the usual holding ratchet and pawl for said shaft. For the purpose of permitting the sprocket wheel 9 to make more than one revolution without turning the shaft 10, I provide the clutch connection, now to be described. The wheel 9 is loosely mounted on the shaft 10, and has a hub portion 13 which carries a clutch member or disk 14 having a fixed projecting tooth 15. Fixedly secured to the shaft 10 is a clutch member 16 in which is formed a circular groove 17 which extends for nearly a full circumference, being closed, however, at 18. 19 is a key, which is seated in the groove 17 to slide therein, with its end projecting in position to be engaged by the lug or projection 15 of the clutch member 14.

Supposing the clutch members to be in the position indicated in Fig. 4, the disk 14 can rotate freely until the lug 15 has moved around to the point *b*, when it engages the projecting end of the key 19, and moves said key around in the groove 17 until the said key comes into engagement with the filled portion 18 of the groove at the point *a*. Thereafter the clutch member 16 will move with the clutch member 14. In this manner it will be seen that nearly two full revolutions of the clutch member 14 may occur without actuating the shaft 10. It will also be seen that the sliding key or device will be operated by either of the clutch members 14—16, depending upon the direction of movement, and that the sliding key or device has a limited nontransmitting movement.

In operation, the wrench or lever is applied to the crank shaft 10 and turned slightly in the closing direction to release the pawl 12 from the ratchet wheel, after which the crank or lever is reversed until the key 19 has traveled to the opposite end of the groove 17 when it will engage the lug 15 on the sprocket 13 moving the segments, through the medium of the chain, from its position beyond the dead center, and thus starting the doors in their opening movement, the weight of the lading completing the opening movement of said doors. Throughout the opening movement of the doors the key 19 is traveling back through the groove 17 so that motion is not transmitted to the crank shaft 10 and by the time key 19 has again reached the end of the groove 17, the doors will have reached their open positions.

In the modification shown in Figs. 6 and 7, the clutch member 20 which is fixed to the shaft 10 is formed with a spiral groove 21, in which is seated a sliding key 22, which is designed to be engaged by a lug or projection 23 on the loose clutch member $14^a$ which carries the sprocket wheel $9^a$. The key or lug 23 is movably seated in a radial groove 24 in the face of the clutch member $14^a$ to enable it to follow the movement of the key 22 in the spiral groove 21. The operation of this form of clutch is substantially the same as that first described, the clutch member $14^a$ being capable of independent movement to substantially the full extent of the length of the spiral groove 21.

In the modification shown in Figs. 8 and 9, the sprocket wheel $9^b$ which carries the chain 8 has an extended hollow hub 25, which is loosely mounted on the shaft 10, and which has an inwardly extending tooth 26 arranged to engage with a spiral groove 27 of a member 28 which is arranged to slide longitudinally on a squared portion of the shaft 10 within the hub. In this form, the hub 25 can rotate independently of the shaft 10 until the member 28 has moved far enough for the closed end of the slot 27 to come up against the key 26, or the end of member 28 stops against the inside of the bearing member, after which shaft 10 will also be rotated.

In the form shown in Fig. 10, $14^c$ is the clutch member which is firmly secured on shaft $10^a$ to which the operator's wrench is to be applied, while the other clutch member $16^c$ is mounted on a squared portion of a shaft $10^b$, to which latter shaft a door operating chain 29 is connected. The clutch members $14^c$ and $16^c$ are connected in the same manner as the members 14 and 16 of Fig. 3.

It will be seen that all the forms of clutches shown permit independent movement of the chain wheel to an extent greater than one revolution of the latter without operating the shaft to which the operator's wrench is applied. The exact extent of this movement can be so proportioned in each case as to take care of the entire opening movement of the doors when they are released. If, therefore, the operator fails to remove his wrench in time, it will simply remain stationary during the opening of the doors and all possibility of injury is thus avoided.

This feature of independent movement of the chain wheel to a greater extent than can be obtained where two stationary projections or clutches engage each other, as has been customary in constructions used heretofore, and which constructions do not permit even of a whole revolution of the chain wheel without moving the shaft to which the wrench is attached, is of great importance, for in order to obtain power in many instances to release or close the doors it is necessary to use a multiplication of power, that is to say the operating shaft located away from the door mechanism proper must move to a greater extent than the door mechanism itself has to move, in order to open and close the doors, and thus require a further movement of the wheel on the operating shaft that cannot be obtained if the projections of the clutch engage each other on opposite sides only and cannot pass each other.

It will be readily understood, as before stated, that the particular forms of door operating mechanism which I have herein shown and described are illustrative only, and that my improved lost-motion clutch may be used wherever the door-operating mechanism is connected to an actuating

296 shaft in such a manner as to make it desirable to provide for a lost movement greater than a single revolution. It will also be understood that other forms of clutches than those herein shown may be employed.

Various changes may be made in the details of construction and arrangement without departing from the spirit and scope of my invention.

What I claim is:—

1. In car door operating mechanism, an actuating member therefor, a shaft for operating the actuating member, and a lost motion device consisting of two clutch members and a sliding key for permitting the actuating member to make at least one complete free revolution with respect to the actuating shaft; substantially as described.

2. In car door operating mechanism, an actuating member, a shaft for actuating said member, and a clutch connection between the shaft and member consisting of two clutch members and a sliding key arranged to permit an independent movement of the parts to an extent equal to or greater than a single revolution of the actuating member; substantially as described.

3. Car door operating mechanism, having a lock, an actuating member for releasing said lock and for operating the mechanism to close the doors, an operating member for the actuating member, and a lost-motion connection between the operating member and the actuating member consisting of two clutch members and a sliding key arranged to permit the actuating member to make more than one complete free revolution; substantially as described.

4. In car door operating mechanism, an actuating member, an operating member for the actuating member, and a clutch connection between said members consisting of two clutch members and a sliding key arranged to permit free rotation of one independently of the other to an extent greater than one revolution; substantially as described.

5. Car door operating mechanism, a chain wheel and chain for actuating said mechanism, a shaft on which the chain wheel is loosely mounted, and a clutch connection between the shaft and chain wheel arranged to permit the latter to make more than one complete independent revolution; substantially as described.

6. In car door operating mechanism, a loose clutch member a stop on the face of said member, a fixed clutch member a groove in said clutch member, and an intermediate member arranged to slide in said groove and to connect the fixed and loose clutch members after more than one complete independent revolution thereof; substantially as described.

7. In car door operating mechanism, a loose clutch member having a lug or projection, a fixed clutch member having a groove formed with a closed portion separating the ends of the groove, and a key member arranged to slide in said groove and to be engaged by the lug or projection of the fixed clutch member; substantially as described.

8. In car door operating mechanism, an actuating member, a shaft on which said member is loosely mounted, a loose clutch member connected to the actuating member, a fixed clutch member, and an intermediate device arranged to effect a connection between the fixed and loose members only after more than one complete revolution thereof; substantially as described.

9. In car door operating mechanism, a door actuating member, a shaft for actuating said member, and a clutch connection between said shaft and member, said clutch having a groove and a movable engaging device arranged to permit at least one complete free revolution of the actuating member; substantially as described.

10. In a car-door operating mechanism, a pair of clutch members and a sliding key interposed between said members for transmitting motion from one of said members to the other.

11. In a car-door operating mechanism, clutch members and a key movable by either for transmitting motion from one of said members to the other, interposed between said members and having a limited non-transmitting movement.

12. In a car-door operating mechanism, clutch members having a guideway formed thereon, a sliding device traveling along said guideway, movable by either for transmitting motion from one of said members to the other, interposed between said members and having a limited nontransmitting movement.

13. In a car door operating mechanism an actuating member therefor, a shaft for operating the actuating member, a stop on said actuating member, an actuated member, a groove in said actuated member, and a stop portion and a sliding key in said groove, said key being adapted to engage with the stop on said actuating member.

14. In a car door operating mechanism, an actuating clutch member, an actuated clutch member, and slidable means in one of said clutch members adapted to engage with the other of said clutch members.

15. In a car door operating mechanism, an actuated clutch member, slidable means mounted in said actuated clutch member and an actuating clutch member adapted to engage said slidable means.

16. In a car door operating mechanism, an actuated clutch member, slidable means mounted in said actuated clutch member, an actuating clutch member, and a lug on said actuating clutch member adapted to engage with said slidable means.

17. In a car door operating mechanism, an actuated clutch member, a slidable key mounted in said actuated clutch member, and an actuating clutch member adapted to engage said key.

18. In a car door operating mechanism, an actuated clutch member having a groove formed therein, slidable means mounted in said groove, an actuating clutch member, and a lug integral with said actuating clutch member adapted to engage said slidable means.

In testimony whereof I affix my signature in presence of two witnesses.

CHARLES A. LINDSTRÖM.

Witnesses:
FRANK E. MILLER,
LELA M. GRUNDER.

Copies of this patent may be obtained for five cents each, by addressing the "Commissioner of Patents, Washington, D. C."